US008186624B2

(12) United States Patent
Fox, Jr.

(10) Patent No.: US 8,186,624 B2
(45) Date of Patent: *May 29, 2012

(54) AERIAL DELIVERY SYSTEM

(76) Inventor: Roy L. Fox, Jr., Belleville, WV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/301,976

(22) Filed: Nov. 22, 2011

(65) Prior Publication Data

US 2012/0061519 A1    Mar. 15, 2012

Related U.S. Application Data

(63) Continuation of application No. 12/481,356, filed on Jun. 9, 2009, now Pat. No. 8,083,184.

(60) Provisional application No. 61/060,394, filed on Jun. 10, 2008.

(51) Int. Cl.
*B64D 1/12* (2006.01)

(52) U.S. Cl. ............. 244/137.3; 244/151 R; 244/151 A; 244/151 B; 244/138 R

(58) Field of Classification Search .............. 244/151 R, 244/151 B, 151 A, 152, 138 R, 137.3; 102/387, 102/393, 489; 89/1.815
See application file for complete search history.

(56) References Cited

U.S. PATENT DOCUMENTS

| | | | |
|---|---|---|---|
| 2,483,088 A | 9/1949 | DeHaven | |
| 2,502,097 A | 3/1950 | Linder | |
| 2,665,153 A | 1/1954 | Gross | |
| 2,712,913 A | 7/1955 | Stanley | |
| 2,774,560 A | 12/1956 | Johnson | |
| 2,924,408 A | 2/1960 | Yost | |
| 3,110,459 A | 11/1963 | Heinrich | |
| 3,122,392 A | 2/1964 | Benditt et al. | |
| 3,266,757 A | 8/1966 | Guienne | |
| 3,466,081 A | 9/1969 | Femia | |
| 3,692,262 A | 9/1972 | Gaylord | |
| 4,030,689 A | 6/1977 | Rodriguez | |
| 4,050,381 A * | 9/1977 | Heinemann | 102/387 |
| 4,155,286 A | 5/1979 | Mihm | |
| 4,161,301 A * | 7/1979 | Beardsley et al. | 244/137.3 |
| 4,256,012 A * | 3/1981 | Cowart et al. | 89/1.816 |
| 4,337,913 A | 7/1982 | Booth | |
| 4,339,098 A | 7/1982 | Tardot et al. | |
| 4,342,437 A * | 8/1982 | Farinacci | 244/137.3 |
| 4,392,411 A | 7/1983 | Minkler | |
| 4,493,240 A | 1/1985 | Norton | |
| 4,592,524 A | 6/1986 | Nohren et al. | |
| 4,697,765 A * | 10/1987 | Wimmer | 244/152 |

(Continued)

OTHER PUBLICATIONS

Restriction Requirement dated Jan. 21, 2011 for U.S. Appl. No. 12/481,356.

(Continued)

*Primary Examiner* — Tien Dinh
*Assistant Examiner* — Justin Benedik
(74) *Attorney, Agent, or Firm* — Snell & Wilmer L.L.P.

(57) ABSTRACT

An aerial delivery system is configured to allow delivery of one or more releasable items after the system is extracted from an aircraft. One or more linear guidance devices and releasable securing mechanisms allow the aerial delivery system to deploy one or more releasable items at an appropriate time. The one or more releasable items may be deployed simultaneously, or in a staged or staggered fashion. Through use of drag or lift-producing devices, the system may be recovered and reused. The attitude and/or azimuth orientation of the system may be varied prior to, during, and/or after release of a releasable item.

20 Claims, 6 Drawing Sheets

U.S. PATENT DOCUMENTS

| | | | |
|---|---|---|---|
| 4,736,669 A * | 4/1988 | Long et al. | 89/1.819 |
| 4,750,404 A | 6/1988 | Dale | |
| 4,765,571 A | 8/1988 | Barbe | |
| 4,911,059 A * | 3/1990 | Brueckner | 89/1.819 |
| 4,955,564 A | 9/1990 | Reuter | |
| 4,998,480 A * | 3/1991 | Denis et al. | 102/393 |
| 5,003,882 A * | 4/1991 | Frehaut et al. | 102/387 |
| 5,205,517 A | 4/1993 | Reuter | |
| 5,361,676 A | 11/1994 | Gibbs | |
| 5,618,011 A | 4/1997 | Sadeck et al. | |
| 5,668,346 A * | 9/1997 | Kunz et al. | 102/387 |
| 5,703,315 A | 12/1997 | Coggan | |
| 2,834,083 A | 5/1998 | Newell et al. | |
| 5,816,535 A | 10/1998 | Underwood | |
| 5,884,867 A * | 3/1999 | Gordon et al. | 244/152 |
| 5,887,825 A | 3/1999 | Noel | |
| 5,890,678 A | 4/1999 | Butler, Jr. | |
| 5,899,415 A * | 5/1999 | Conway et al. | 244/152 |
| 6,070,832 A * | 6/2000 | Redd | 244/137.3 |
| 6,249,937 B1 | 6/2001 | Grenga | |
| 6,260,797 B1* | 7/2001 | Palmer | 244/49 |
| 6,308,642 B1 | 10/2001 | Branam | |
| 6,339,929 B1* | 1/2002 | Udagawa et al. | 60/468 |
| 6,644,597 B1 | 11/2003 | Bahniuk | |
| 6,669,146 B2 | 12/2003 | Lee et al. | |
| 6,789,766 B2 | 9/2004 | Horst | |
| 7,252,270 B2 * | 8/2007 | Mitzmacher | 244/171.3 |
| 7,264,205 B2 | 9/2007 | Fox, Jr. | |
| 7,967,254 B2 | 6/2011 | Fox | |
| 8,033,507 B2 | 10/2011 | Fox | |
| 8,083,184 B2 | 12/2011 | Fox | |
| 2004/0108416 A1* | 6/2004 | Parkinson | 244/137.4 |
| 2005/0230555 A1* | 10/2005 | Strong | 244/152 |
| 2008/0017754 A1 | 1/2008 | Taylor | |
| 2008/0149775 A1* | 6/2008 | Dunker et al. | 244/147 |
| 2008/0283669 A1 | 11/2008 | Hansson et al. | |

OTHER PUBLICATIONS

Office Action dated Jun. 8, 2011 for U.S. Appl. No. 12/750,921.
Final Office Action dated Oct. 18, 2011 for U.S. Appl. No. 12/750,921.
Notice of Allowance dated Oct. 11, 2011 for U.S. Appl. No. 12/535,099.
Notice of Allowance dated May 12, 2011 for U.S. Appl. No. 12/576,604.
Notice of Allowance dated Sep. 1, 2011 for U.S. Appl. No. 12/481,356.
Notice of Allowance dated Apr. 18, 2011 for U.S. Appl. No. 12/698,289.
Restriction Requirement dated Feb. 23, 2010 for U.S. Appl. No. 12/535,099.
Notice of Allowance dated Jan. 19, 2010 for U.S. Appl. No. 11/733,542.
Office Action dated Jan. 31, 2011 for U.S. Appl. No. 12/576,604.
Restriction Requirement dated Feb. 7, 2011 for U.S. Appl. No. 12/750,921.
Office Action dated Jul. 22, 2010, for U.S. Appl. No. 12/535,099.
Restriction Requirement dated Dec. 20, 2010 for U.S. Appl. No. 12/576,604.
Restriction Requirement dated Jan. 21, 2011 for U.S. Appl. No. 12/698,289.
Office Action dated Jan. 10, 2011 for U.S. Appl. No. 12/535,099.

* cited by examiner

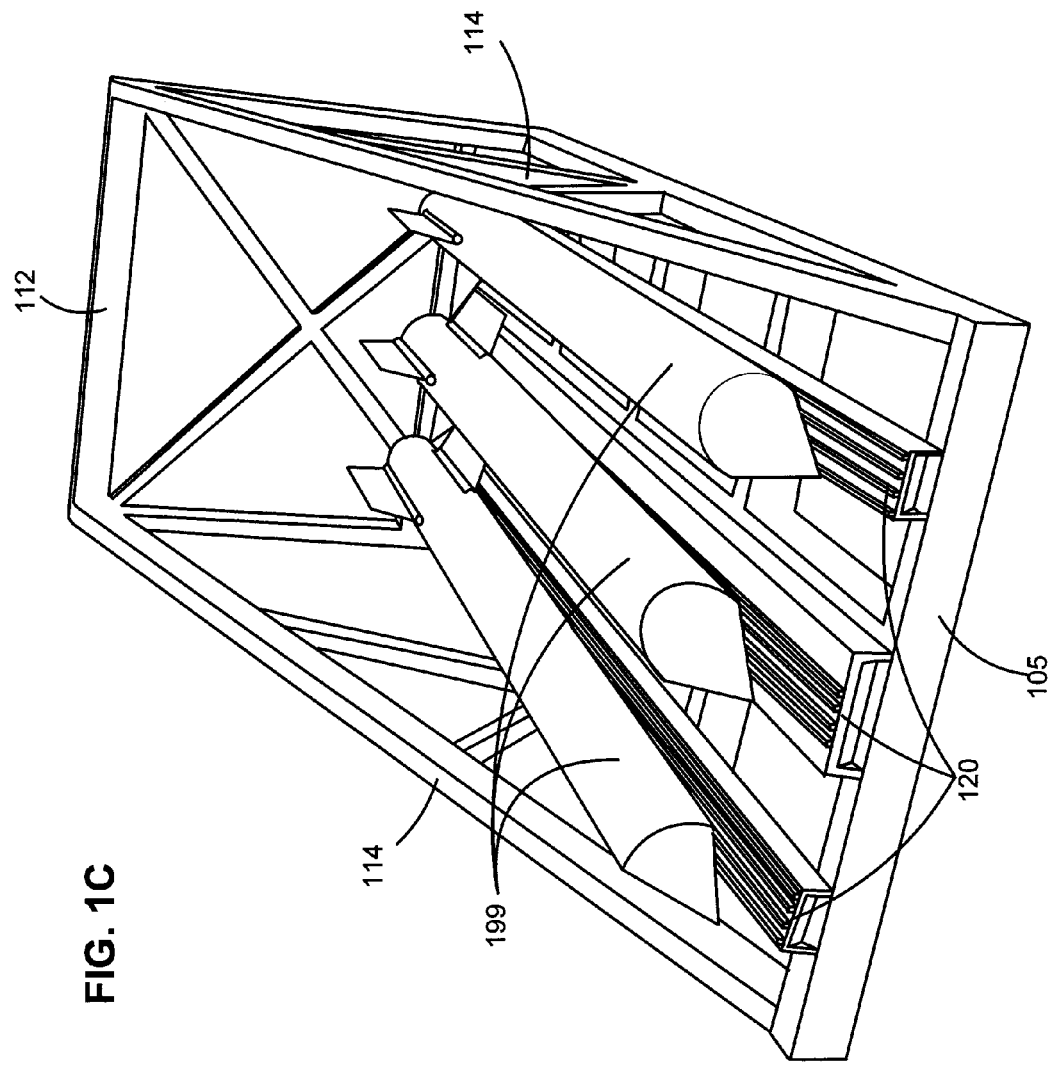

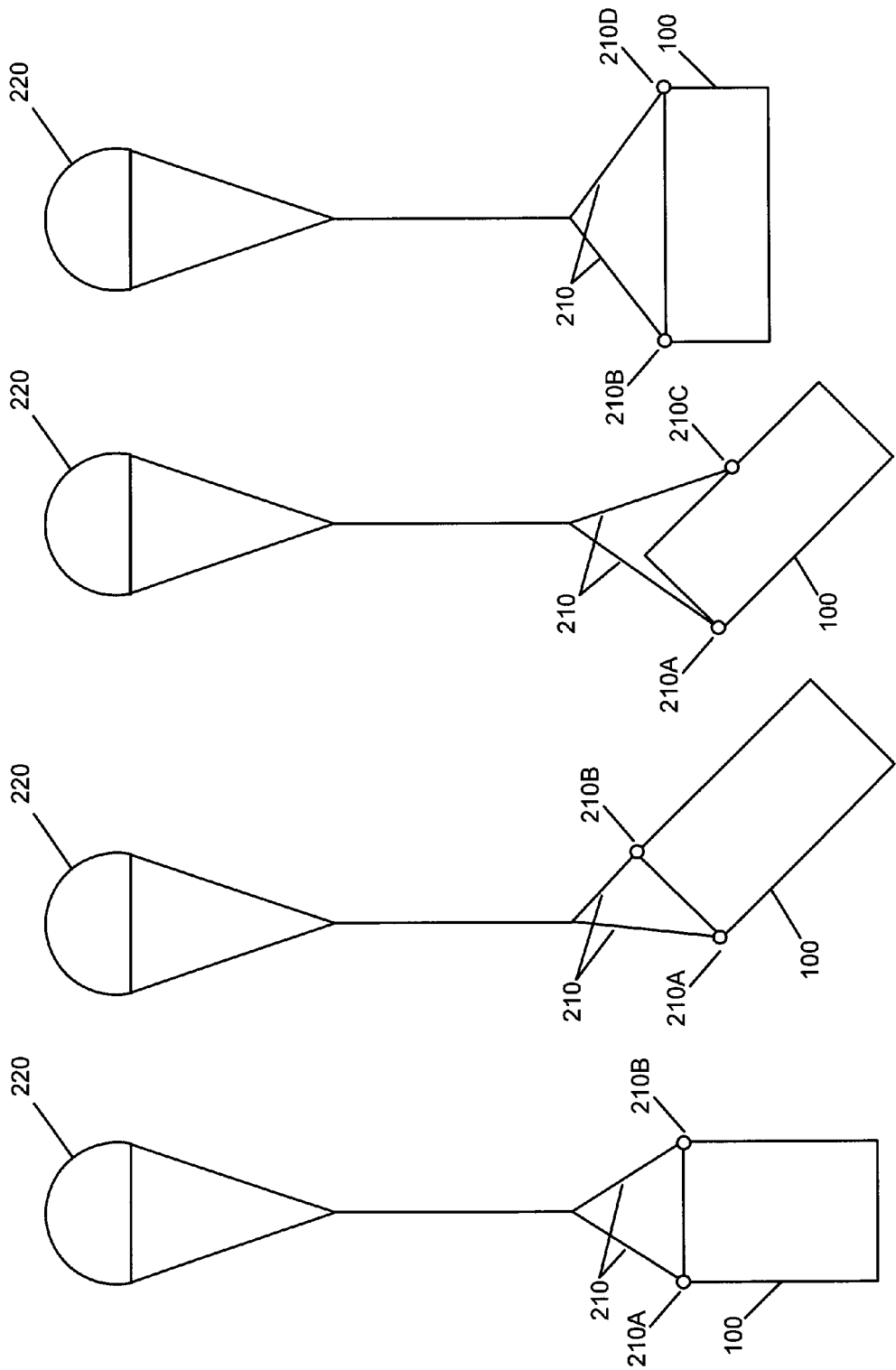

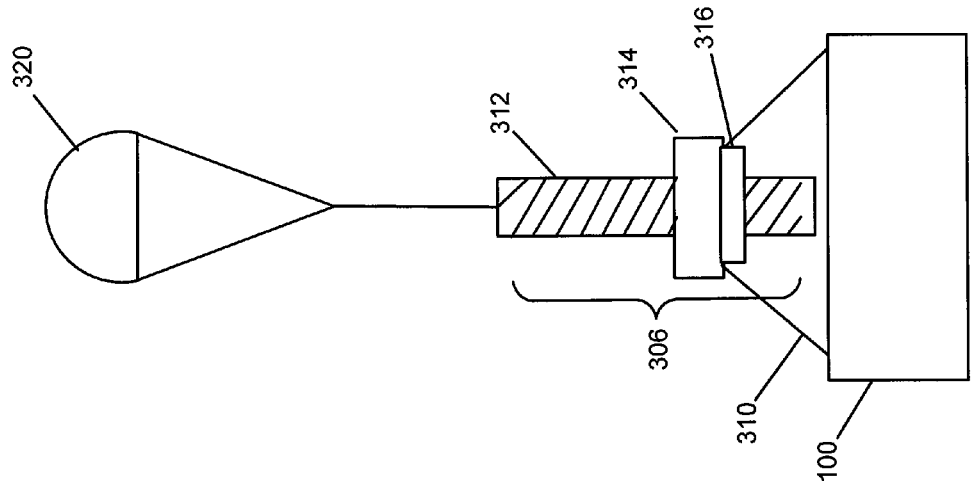
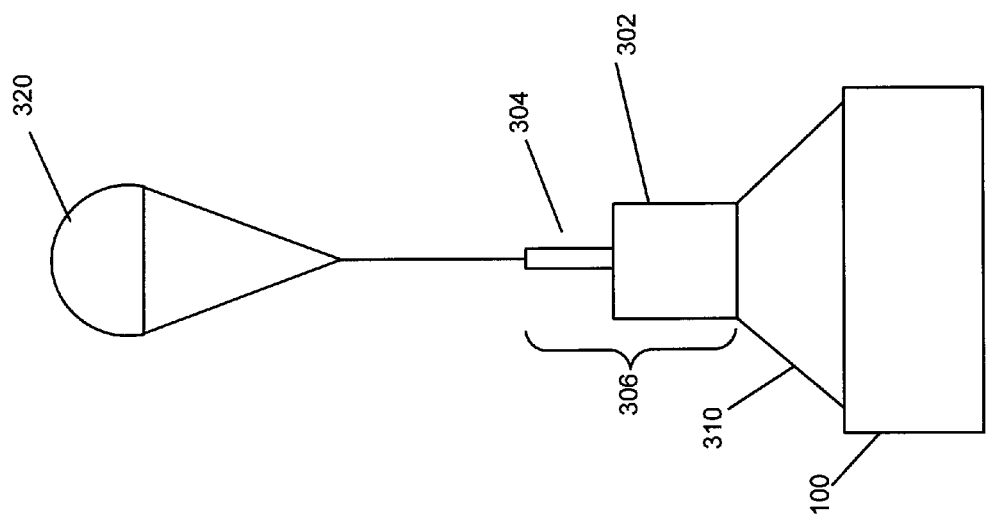

AERIAL DELIVERY SYSTEM

CROSS REFERENCE TO RELATED APPLICATIONS

This application is a continuation of U.S. Ser. No. 12/481,356 filed on Jun. 9, 2009, now U.S. Pat. No. 8,083,184 entitled "AERIAL DELIVERY SYSTEM". U.S. Ser. No. 12/481,356 is a non-provisional of U.S. Provisional No. 61/060,394 filed on Jun. 10, 2008 and entitled "AERIAL DELIVERY SYSTEM." The entire contents of each of the foregoing applications are hereby incorporated by reference.

TECHNICAL FIELD

The present disclosure relates to aerial delivery, particularly delivery achieved via mid-air extraction from an aircraft.

BACKGROUND

Aerial delivery is a term used to describe extracting an item from an aircraft in flight and then enabling a safe recovery of the item by use of an aerodynamic decelerator, which is most often a parachute system. Additionally, the aerial delivery operation is typically conducted from a cargo-type aircraft. The process may utilize very specific aerial delivery equipment and may adhere to very specific aerial delivery operational procedures. Often, the extracted item consists of an aerial delivery system containing cargo of some sort.

Two general types of extraction are utilized. Gravity extraction is the technique of using positive aircraft pitch angle, or by using some other force to cause the item to simply roll or slide out of the aircraft, which is typically followed by a parachute being deployed by a lanyard that is anchored to the aircraft. Parachute extraction is a technique whereby a parachute is first deployed out the rear of the cargo compartment, and the parachute is used to pull the item from the aircraft. Both techniques may conform to guidelines regarding length, weight, mass, etc., of the item being extracted in order to achieve a safe extraction operation. Generally speaking, relatively short and/or relatively lightweight items may be gravity extracted, but relatively long and/or relatively heavy items may preferably be parachute extracted, which removes the item from the aircraft quickly to prevent it from adversely affecting the aircraft's center of balance.

Items having a generally cylindrical shape, such as bombs that are powered by gravity, will typically be released from the belly or wing of a bomber or fighter aircraft. In practice, these items are released vertically but their longitudinal axis is substantially horizontal. Because the lower bomb racks in a bomb bay may be repositioned before other items can be released from racks above them, a simultaneous release of all items in the bomb bay cannot generally be conducted. The relatively long release time, coupled with a relatively high airspeed that is a feature of these aircraft, prevents the items from impacting in a concentrated area. Instead, the resulting impact path of the items is quite lengthy and the resulting impact effect is known as carpet bombing.

For aerial launching of chemical energy powered items, such as missiles, yet another technique is used. In this scenario, items are loaded into linear guidance devices, which are typically referred to as launchers. Typically, these launchers are either tubular or monorail (dovetail) in design, and are mounted substantially horizontally on fighter airplanes or helicopters. In practice, these items are generally powered by a self-contained rocket motor, allowing only one item to be loaded per launcher. Otherwise, the rocket blast from the front item could damage the item behind it, perhaps even causing it to explode while it is still in the launcher.

In yet another scenario, the GBU-43/B Massive Ordinance Air Blast ("MOAB") munition is secured in a cradle atop an aerial delivery system that is parachute extracted from the cargo compartment of a cargo aircraft. The MOAB cradle is just that—a cradle; and, because the MOAB is a winged item, it must be separated from its cradle immediately outside the aircraft, with the extraction parachute still attached to the aerial delivery system, before the cradle can pitch or roll significantly—otherwise, the MOAB is likely to be damaged or released in an undesirable attitude. In the separation process, the MOAB has forward momentum due to inertia imparted by the aircraft, but the aerial delivery system and cradle will slow significantly, due to drag created by the still attached extraction parachute. The aerial delivery system will also pitch, with its leading edge going downward due to gravity and aerodynamic forces. The combination of relative longitudinal motion and a pitch-down of the aerial delivery system and cradle, allow the platform and cradle to move down and rearward, away from the MOAB. However, because this separation technique does not provide linear guidance control, or roll and yaw control, relative to the cradle, the rear control surfaces of the MOAB must be in a retracted configuration until after the separation event has occurred. Even though this marginally controlled separation technique is acceptable for the MOAB, it may be unsuitable if the separation event were significantly delayed after the system has been released from the aircraft. Further, because the separation technique provides no directional control or roll and yaw control for the separating item, it may be unsuitable for launching items with extended rear-mounted control surfaces, such as fins. With no directional or roll and yaw control, it may also be unsuitable for simultaneously launching multiple items that have any type of extended control surfaces.

SUMMARY

An aerial delivery system enables delivery of releasable items after extraction from an aircraft. In an exemplary embodiment, an aerial delivery system comprises a platform, a first linear guidance device coupled to the platform, and a releasable securing mechanism. The releasable securing mechanism is configured to couple a releasable item to the first linear guidance device.

In another exemplary embodiment, a method comprises coupling a first releasable item to an aerial delivery system comprising a first releasable securing mechanism. A drogue parachute is deployed to cause the aerial delivery system to exit an aircraft. A first releasable securing mechanism is activated to separate the first releasable item from the aerial delivery system. The releasable item separates from the aerial delivery system under the influence of a linear guidance device.

In another exemplary embodiment, a method for controlling the attitude of a payload comprises coupling a first strap having a first length to the payload, and coupling a second strap having a second length to the payload. The second length is different from the first length. The first strap and the second strap are coupled to a parachute, and the payload is deployed from an aircraft. The parachute is deployed to cause the payload to achieve a predetermined orientation responsive to the weight of the payload.

In another exemplary embodiment, a method for controlling the azimuth of a payload comprises coupling a payload to a rotation mechanism, coupling the rotation mechanism to a parachute, deploying the payload from an aircraft, deploying the parachute to cause the payload to be suspended beneath the parachute, and activating the rotation mechanism to cause the payload to rotate with respect to the parachute.

In another exemplary embodiment, a method for controlling the azimuth of a payload comprises issuing a first move command to a motor. The motor is coupled to a payload and to a parachute. Responsive to the first move command, a motor shaft is moved a first time to rotate the payload with respect to the parachute to bring the payload into a desired azimuth orientation. Responsive to a change in the azimuth orientation of the payload, a second move command is issued to the motor. Responsive to the second move command, a motor shaft is moved a second time to rotate the payload with respect to the parachute to restore the payload to a desired azimuth orientation.

In another exemplary embodiment, a computer-readable medium has stored thereon, computer-executable instructions that, if executed by a system, cause the system to perform a method comprising issuing a first move command to a motor. The motor is coupled to a payload and to a parachute. Responsive to the first move command, a motor shaft is moved a first time to rotate the payload with respect to the parachute to bring the payload into a desired azimuth orientation. Responsive to a change in the azimuth orientation of the payload, a second move command is issued to the motor. Responsive to the second move command, a motor shaft is moved a second time to rotate the payload with respect to the parachute to restore the payload to a desired azimuth orientation.

The contents of this summary section are provided only as a simplified introduction to the disclosure, and are not intended to be used to limit the scope of the appended claims.

BRIEF DESCRIPTION OF THE DRAWINGS

With reference to the following description, appended claims, and accompanying drawings:

FIG. 1C illustrates an aerial delivery system comprising multiple linear guidance devices in accordance with an exemplary embodiment of the invention;

FIGS. 2A-2D illustrate an aerial delivery system configured for varied attitudes in accordance with various exemplary embodiments of the invention; and FIGS. 3A-3B illustrate an aerial delivery system configured for various azimuth orientations in accordance with an exemplary embodiment of the invention.

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for aerial delivery may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical aerial delivery system.

Figure 1A:
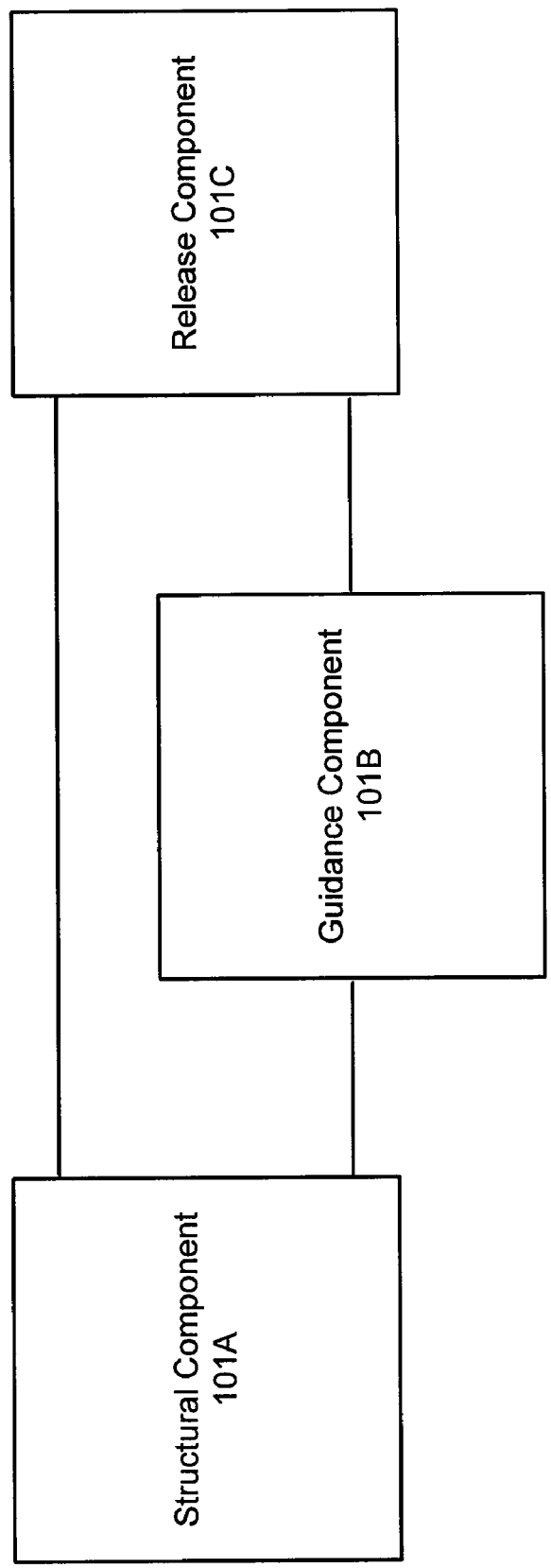
FIG. 1A illustrates a block diagram of an aerial delivery system in accordance with various exemplary embodiments of the invention.

An aerial delivery system may be any system configured to support a payload during extraction from an aircraft and/or during the resulting descent and contact with the ground. In accordance with an exemplary embodiment, and with reference to FIG. 1A, an aerial delivery system generally comprises a structural component 101A, a guidance component 101B, and a release component 101C. Structural component 101A is configured to provide support to a payload during and/or after extraction of the payload from an aircraft. Guidance component 101B is coupled to structural component 101A, and is configured to at least partially guide and/or direct the separation of the payload from the aerial delivery system. Release component 101C is coupled to structural component 101A and/or guidance component 101B, and is configured to secure the payload to guidance component 101B until separation of the payload is desired.

Moreover, an aerial delivery system may be configured with any appropriate components and/or elements configured to support a payload during extraction from an aircraft and/or during the resulting descent and contact with the ground. For example, with reference now to FIGS. 1A, 1B and 1C, and in accordance with an exemplary embodiment, an aerial delivery system 100 comprises structural component 101A (for example, platform 105), at least one guidance component 101B (for example, linear guidance device 120), and at least one release component 101C (for example, releasable securing mechanism 130). At least one releasable item 199 is coupled to linear guidance device 120, and is prevented from separating by releasable securing mechanism 130. In various exemplary embodiments, structural component 101A further comprises an upright rear section 112, at least one upright side section 114, and at least one sling attachment fitting 116. In an exemplary embodiment, a stabilization device 150 is coupled to aerial delivery system 100. In another exemplary embodiment, a recovery device 160 is coupled to aerial delivery system 100. In various exemplary embodiments, both a stabilization device 150 and a recovery device 160 are coupled to aerial delivery system 100.

Platform 105 may comprise any suitable material or structure configured to be deployed via the cargo door of an aircraft. In accordance with an exemplary embodiment, platform 105 comprises a substantially planar structure with supporting ribs or other reinforcing elements. In an exemplary embodiment, platform 105 is made of aluminum. In another exemplary embodiment, platform 105 is made of steel. In an exemplary embodiment, platform 105 is coupled to upright rear section 112, two upright side sections 114, and at least one linear guidance device 120. Moreover, platform 105 may comprise various structural elements, materials, and configurations suitable to be deployed via the cargo door of an aircraft. Additionally, platform 105 may be coupled to any appropriate components of aerial delivery system 100, as desired.

Linear guidance device 120 may be any appropriate structure configured to guide at least one releasable item 199 as it separates from aerial delivery system 100. In accordance with an exemplary embodiment, at least one linear guidance device 120 is provided. In an exemplary embodiment, linear guidance device 120 is a monorail. In another exemplary embodiment, and with momentary reference to FIG. 1D, linear guidance device 120 is a tubular structure. Further, linear guidance device 120 may be configured in a manner which allows release of releasable items 199 having extended, rear-mounted control surfaces (e.g., fins, wings, flanges, stabilizer bars, and/or the like). Moreover, although referred to as "linear", linear guidance device 120 may be configured with various curves, angles, and/or the like, as appropriate.

Linear guidance device 120 is coupled to platform 105. Linear guidance device 120 may also be coupled to rear section 112 and/or side section 114, and/or to one or more additional linear guidance devices 120. In an exemplary embodiment, linear guidance device 120 is made of aluminum. In another exemplary embodiment, linear guidance device 120 is made of steel. Moreover, linear guidance device 120 may be made of any suitable material configured to guide, support, and/or otherwise interact with a releasable item 199. In an exemplary embodiment, aerial delivery system 100 is configured with one linear guidance device 120. In another exemplary embodiment, aerial delivery system 100 is configured with two linear guidance devices 120. Moreover, aerial delivery system 100 may be configured with any desired number of linear guidance devices 120.

With reference now to FIG. 1C, multiple linear guidance devices 120 may be coupled to platform 105. In an exemplary embodiment, multiple linear guidance devices 120 are located alongside one another. In another exemplary embodiment, multiple linear guidance devices 120 are located atop one another. In other exemplary embodiments, multiple linear guidance devices 120 may be arranged in a grid or other three-dimensional pattern. Moreover, multiple linear guidance devices 120 may be arranged in any suitable manner configured to allow release of multiple releasable items 199. Further, each linear guidance device 120 may guide one releasable item 199. Each linear guidance device 120 may also guide multiple releasable items 199, for example releasable items 199 installed in a "heel to toe" configuration. Moreover, aerial delivery system 100 may comprise any combination of linear guidance devices 120, releasable items 199, and/or releasable securing mechanisms 130.

Figure 1B:
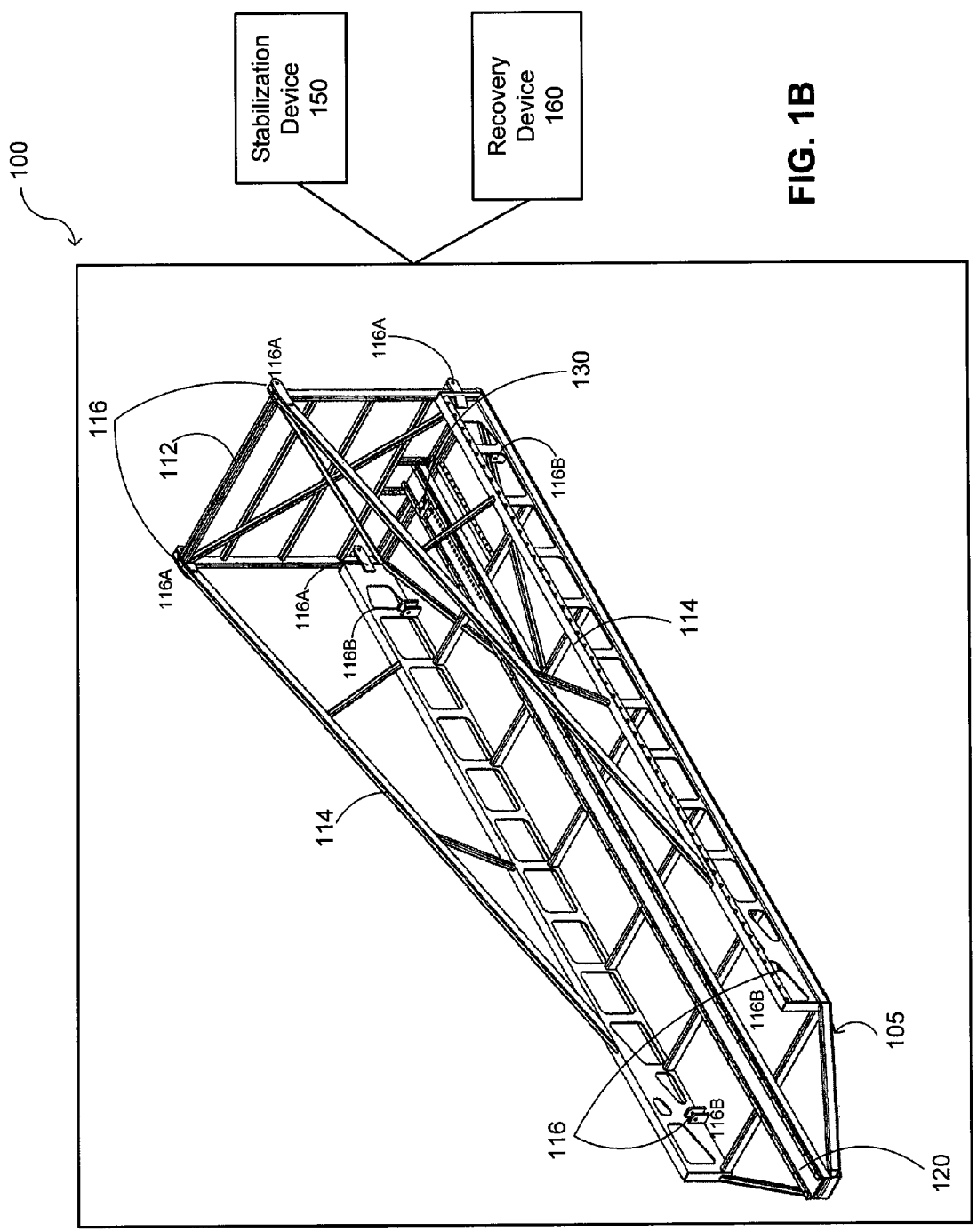
FIG. 1B represents an aerial delivery system in accordance with an exemplary embodiment of the invention.
Figure 1D:
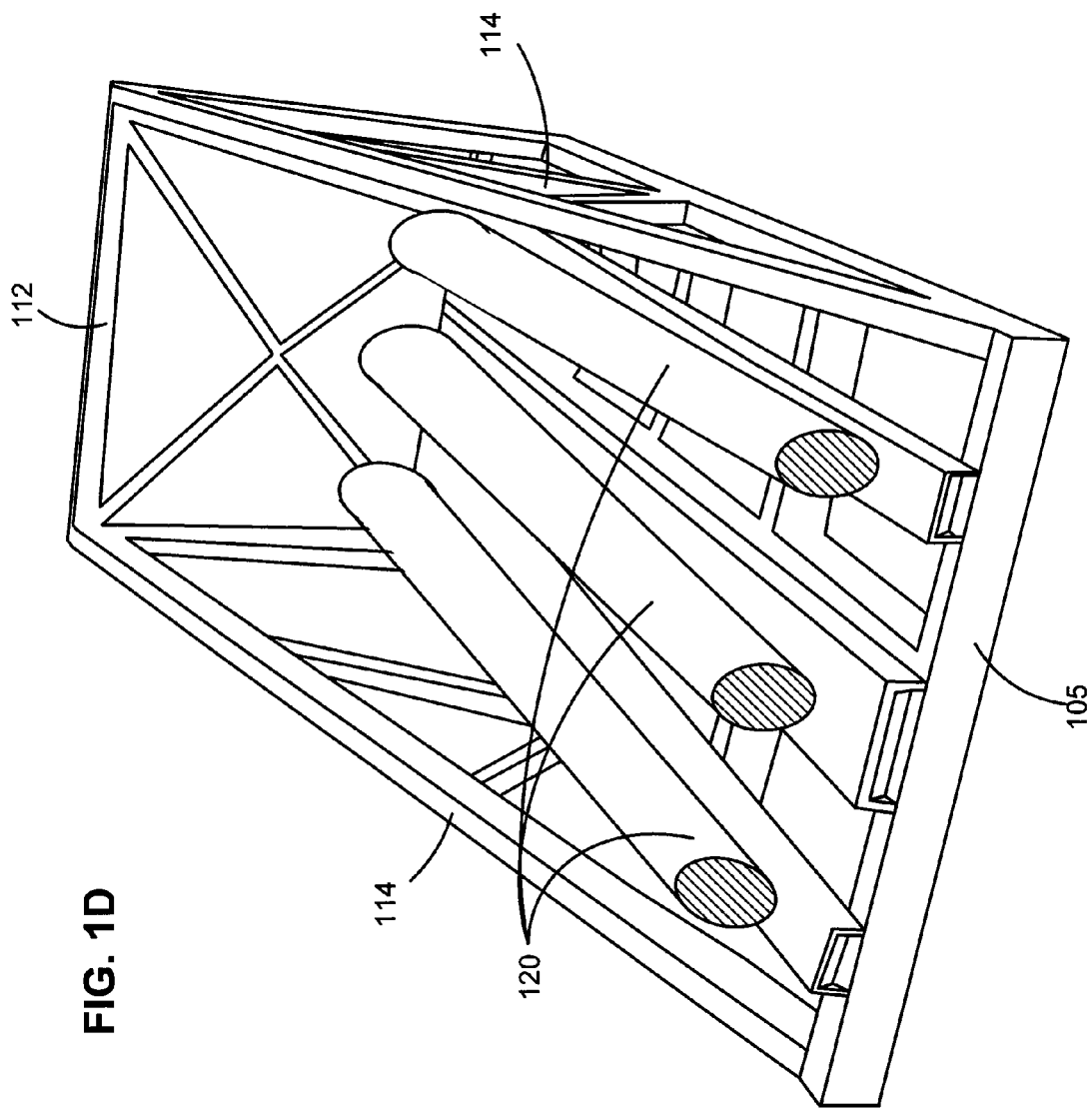
FIG. 1D illustrates an aerial delivery system comprising multiple tubular linear guidance devices in accordance with an exemplary embodiment of the invention.

Releasable securing mechanism 130 may be any suitable mechanism configured to allow releasable item 199 to separate from linear guidance device 120. With reference to FIGS. 1B and 1C, in accordance with an exemplary embodiment, a releasable item 199 is secured to a linear guidance device 120 via releasable securing mechanism 130. In an exemplary embodiment, releasable securing mechanism 130 is a pyrotechnic device configured to sever one or more restraining straps (e.g., a reefing cutter, and/or the like). In another exemplary embodiment, releasable securing mechanism 130 is an explosive bolt. In yet another exemplary embodiment, releasable securing mechanism comprises a stored energy spring configured to impart a force to a releasable item 199. In this embodiment, releasable item 199 may be at least partially ejected from aerial delivery system 100 responsive to the operation of the stored energy spring. Moreover, releasable securing mechanism 130 may comprise any suitable material, machinery, components, and/or configurations suitable to cause and/or permit releasable item 199 to separate from linear guidance device 120.

Moreover, structural component 101A of aerial delivery system 100 may comprise any combination of reinforcing members, supporting members, platforms, walls, sections, fasteners, braces, joints, links, welds, couplings, and/or the like. For example, returning to FIGS. 1A-1C, and in various exemplary embodiments, structural component 101A further comprises an upright rear section 112, at least one upright side section 114, and at least one sling attachment fitting 116. In other exemplary embodiments, structural component 101A further comprises at least one sling attachment fitting 116. In still other exemplary embodiments, structural component 101A further comprises two upright side sections 114. Moreover, structural component 101A may comprise any combination of platforms 105, upright rear sections 112, upright side sections 114, sling attachment fittings 116, and/or the like, as desired.

Rear section 112 may comprise any suitable material or structure configured to be deployed via the cargo door of an aircraft. Further, rear section 112 may comprise any suitable material or structure configured to couple with suspension slings and/or other components of aerial delivery system 100. In accordance with an exemplary embodiment, upright rear section 112 comprises a substantially planar structure with supporting ribs or other reinforcing elements. In an exemplary embodiment, rear section 112 is made of aluminum. In another exemplary embodiment, rear section 112 is made of steel. Rear section 112 is coupled to platform 105 and to side sections 114. Four sling attachment fittings 116, for example sling attachment fittings 116A, are coupled to rear section 112. Sling attachment fittings 116A are preferably located at the four corners of rear section 112. However, sling attachment fittings 116A may be coupled to various locations of rear section 112, and more or less sling attachment fittings 116A may be provided as appropriate. Further, sling attachment fittings 116A may be located on aerial delivery system 100 in any manner configured to allow aerial delivery system 100 to achieve a desired orientation, for example a substantially vertical orientation, once extracted from an aircraft.

Side section 114 may comprise any suitable material or structure configured to be deployed via the cargo door of an aircraft. Further, side section 114 may comprise any suitable material or structure configured to couple with suspension slings and/or other components of aerial delivery system 100. In accordance with an exemplary embodiment, an upright side section 114 comprises a substantially planar structure with supporting ribs or other reinforcing elements. In an exemplary embodiment, side section 114 is made of aluminum. In another exemplary embodiment, side section 114 is made of steel. Moreover, in various exemplary embodiments, side section 114 is made of cable, textile material, and/or the like. Side section 114 is coupled to platform 105 and to rear section 112.

In an exemplary embodiment, two sling attachment fittings 116, such as sling attachment fittings 116B, are coupled to each side section 114. Sling attachment fittings 116B are preferably located near the front and rear of each side section 114. However, sling attachment fittings 116B may be coupled to various locations of each side section 112, and more or fewer sling attachment fittings 116B may be provided as appropriate. Further, sling attachment fittings 116B may be located on aerial delivery system 100 in any manner configured to allow aerial delivery system 100 to achieve a desired orientation, for example a substantially horizontal orientation, after a recovery device is deployed. For example, sling attachment fittings may be located at the corners of platform 105. Moreover, any number of sling attachment fittings 116A and/or 116B may be located on aerial delivery system 100 in any manner configured to allow aerial delivery system 100 to achieve a desired attitude after a recovery device is deployed. For example, a sling attachment fitting 116B may be located near the midpoint of each side section 114. These sling attachment fittings 116B, in connection with sling attachment fittings 116B located at the rear of each side section 114, will enable aerial delivery system 100 to achieve an inclined attitude after a stabilization device 150 is deployed.

Stabilization device 150 may comprise any drag or lift-producing device configured to orient aerial delivery system 100 in a desired orientation (for example, a substantially vertical orientation) once extracted from an aircraft. Continuing to reference FIG. 1B, and in accordance with an exemplary embodiment, stabilization device 150 comprises a ballistic parachute. A ballistic parachute serves to slow the vertical velocity of aerial delivery system 100 and/or to keep it in a substantially vertical orientation as it drifts with the wind. In another exemplary embodiment, stabilization device 150 comprises a guided parachute. A guided parachute will not only slow the descent velocity and provide vertical stabilization to aerial delivery system 100, it may be used to allow aerial delivery system 100 to loiter over a particular point on the surface, or it may be used to allow aerial delivery system 100 to omnidirectionally traverse the wind column in which it is descending.

In an exemplary embodiment, stabilization device 150 is coupled to aerial delivery system 100 at sling attachment fitting locations 116A. Multiple suspension slings connect sling attachment fitting locations 116A to a parachute release device, for example the parachute release assembly disclosed in U.S. Pat. No. 7,264,205. A webbing suspension riser assembly connects the parachute release device to the stabilization device suspension member convergence point. Moreover, stabilization device 150 may be coupled to aerial delivery system 100 at any suitable location configured to orient aerial delivery system 100 in a desired orientation (for example, a vertical orientation, a horizontal orientation, a partially inclined orientation, and/or the like) once extracted from an aircraft. Further, stabilization device 150 may be coupled to aerial delivery system 100 in a manner configured to allow stabilization device 150 to be separated from aerial delivery system 100.

In an exemplary embodiment, stabilization device 150 functions as an extraction parachute configured to drag aerial delivery system 100 from an aircraft. Alternatively, a separate extraction parachute may drag aerial delivery system 100 from the aircraft. This separate extraction parachute may also function as a pilot parachute to deploy stabilization device 150.

When separated from aerial delivery system 100, stabilization device 150 may trigger deployment of recovery device 160. Alternatively, stabilization device 150 may be separated from aerial delivery system 100 without deploying any recovery device, causing aerial delivery system 100 to fall and consequently be damaged or destroyed upon impact with the ground.

Recovery device 160 may comprise any drag or lift-producing device configured to allow aerial delivery system 100 to be recovered and/or reused. Continuing to reference FIG. 1B, and in accordance with an exemplary embodiment, recovery device 160 comprises a ballistic parachute. In another exemplary embodiment, recovery device 160 comprises a guided parachute.

In an exemplary embodiment, recovery device 160 is coupled to aerial delivery system assembly 100 at sling attachment fitting locations 116B. Moreover, recovery device 160 may be coupled to aerial delivery system 100 at any suitable location and/or in any suitable manner configured to orient aerial delivery system 100 in a desired orientation (for example, a substantially horizontal orientation, a substantially vertical orientation, and/or the like) once extracted from an aircraft.

In accordance with an exemplary embodiment, after being extracted from an aircraft, aerial delivery system 100 will begin transitioning to a vertical attitude due to drag produced by stabilization device 150. With aerial delivery system 100 stabilized in a generally vertical attitude, at least one releasable item 199 may be released at the users' discretion. According to an exemplary embodiment, aerial delivery system 100 may contain only one releasable item 199. In other exemplary embodiments, aerial delivery system 100 contains multiple releasable items 199. A releasable item 199 may be configured for any specific purpose. For example, releasable item 199 could be a target for a tracking system; alternatively, releasable item 199 could be a test vehicle, which could be allowed to free fall to obtain a desired velocity for parachute testing; further, releasable item 199 could be a piece of ordnance too large to fit a conventional aircraft. Upon activation of releasable securing mechanism 130, gravity causes releasable item 199 to separate from aerial delivery system 100 under the influence of linear guidance device 120.

In an exemplary embodiment, releasable item 199 is allowed to fall with a ballistic trajectory. In another exemplary embodiment, releasable item 199 is steered, as "smart bombs" are steered. Further, a releasable item 199 may be equipped with a ballistic or guided parachute system. Thus, if multiple releasable items 199 are released, they may all land in one small area or, by using specific time intervals between releases and/or by using drag or lift-producing devices to slow the descent rate or to provide traversing capability of releasable items 199, multiple targets can be reached. Moreover, as discussed below, the attitude and/or azimuth of aerial delivery system 100 may be varied before and/or between releases in order to more effectively direct releasable items 199 toward one or more targets.

Multiple releasable items 199 may be dropped individually, or they may be dropped simultaneously, or they may be released as any combination of the two. For example, successive individual releasable items 199, such as "bunker buster" bombs, may be released, each time-sequenced to arrive in a manner configured to form a successively deeper crater, and then multiple releasable items 199 may be released simultaneously to act as a "knockout punch."

Further, in accordance with various exemplary embodiments, because releasable items 199 are dependent on gravity to extract them from linear guidance device 120, multiple chemical propelled devices (such as missiles) can be accommodated by individual linear guidance devices 120 (e.g., by delaying rocket motor ignition until each missile has separated from linear guidance device 120). Additionally, because aerial delivery system 100 will have minimal airspeed once extracted from an aircraft, an entire group of releasable items 199 may be released to impact in one concentrated area instead of having a typical carpet-bombing pattern, even if no guidance system is used. Further, release of one or more releasable items 199 may be delayed for an extended period after aerial delivery system 100 has been extracted from an aircraft. In various exemplary embodiments, release of a releasable item 199 from aerial delivery system 100 may be delayed for a time between about five (5) seconds and one (1) minute after extraction of aerial delivery system 100. However, release of a releasable item 199 may be delayed any appropriate amount of time configured to achieve a desired delivery objective for releasable item 199.

If aerial delivery system 100 is to descend into hostile terrain, or into a combat zone, it may be preferable to allow aerial delivery system 100 to simply land at a relatively high rate of descent under stabilization device 150. Alternatively, it may be preferable to release stabilization device 150 in mid-air, causing aerial delivery system 100 to crash, and allowing one or more components of aerial delivery system 100 to be damaged or destroyed. For this purpose, a parachute release mechanism, such as the mechanism disclosed in U.S. Pat. No. 7,264,205, may be suitably employed.

However, aerial delivery system 100 may be expensive and, if conditions allow, it is very likely that a system user will desire to reuse aerial delivery system 100 or a portion thereof. According to an exemplary embodiment, a release mechanism can be used to release stabilization device 150 from aerial delivery system 100. The departing stabilization device 150 may then function as a pilot parachute to deploy a recovery device 160. Recovery device 160 may also be deployed in any suitable manner known in the art.

Moreover, during descent of aerial delivery system 100, it may be desirable to control the attitude of aerial delivery system 100. For example, if a releasable item 199 comprises a chemical-propelled rocket, it may be desirable to allow the rocket to be launched at a certain attitude (for example, at a 90 degree angle to the vertical, at a 135 degree angle to the vertical, and/or the like) rather than directly downward. Accordingly, the aerial delivery system 100 of the present disclosure may be configured to support varied attitudes. With reference now to FIGS. 2A-2D, and in accordance with various exemplary embodiments, aerial delivery system 100 may be configured to achieve various attitudes once deployed. For example, with reference now to FIG. 2A, a generally rectangular aerial delivery system 100 may be suspended beneath a parachute 220 via one or more slings 210 coupled to aerial delivery system 100 at locations 210A and 210B. Slings 210 are of about equal length; thus, aerial delivery system 100 is oriented substantially vertically.

However, the attitude of aerial delivery system 100 may be varied by changing the length of one or more slings 210. With reference now to FIG. 2B, in an exemplary embodiment, aerial delivery system 100 is coupled to one or more slings 210 at locations 210A and 210B. As illustrated, the length of sling 210 coupled to location 210B is shorter than the length of sling 210 coupled to location 210A. Thus, due to the uneven sling length, aerial delivery system 100 is oriented at least partially away from the vertical, as shown. In this manner, mid-air release of one or more releasable items 199 at an angle away from vertical may be achieved. For example, when releasable item 199 is a chemical-propelled rocket, the rocket may be at least partially pointed toward a desired target, and thus post-release course corrections and other adjustments to the trajectory of releasable item 199 can be reduced.

Moreover, the attitude of aerial delivery system 100 may also be varied by changing the location of one or more sling attachment fittings. With reference now to FIG. 2C, in an exemplary embodiment, aerial delivery system 100 is coupled to one or more slings 210 at locations 210A and 210C. As illustrated, although the length of sling 210 coupled to location 210A is about the same as the length of sling 210 coupled to location 210C, aerial delivery system 100 is oriented away from the vertical as a result of the placement of locations 210A and 210C. As before, mid-air release of one or more releasable items 199 at an angle away from vertical may thus be achieved. Moreover, with further reference to FIG. 2D, various sling mounting locations may be utilized to achieve a desired attitude of aerial delivery system 100.

In addition to controlling, selecting, and/or otherwise modifying the attitude of aerial delivery system 100, the azimuth of aerial delivery system can be controlled, selected, and/or otherwise modified in order to "point" aerial delivery system 100 in a desired direction. For example, aerial delivery system 100 may be coupled to a guided parachute, and aerial delivery system 100 may thus be "pointed" via operation of the guided parachute. Moreover, aerial delivery system 100 may also be configured to achieve a modified azimuth orientation when coupled to either a guided parachute or a non-guided parachute. For example, aerial delivery system 100 may be further equipped with a rotating mechanism located between the payload portion of aerial delivery system 100 and the parachute. In this manner, aerial delivery system 100 may be configured to achieve a particular azimuth orientation responsive to operation of the rotating mechanism. Such flexibility can be extremely valuable, for example, when orienting chemical-propelled rockets for eventual release and separation from aerial delivery system 100.

Turning now to FIG. 3A, and in accordance with various exemplary embodiments, illustrated is a mechanism for achieving azimuth control of aerial delivery system 100 while descending under the influence of parachute 320. Aerial delivery system 100 is coupled to one or more slings 310. A rotation mechanism 306 is disposed between slings 310 and parachute 320. Rotation mechanism 306 may comprise any suitable mechanism configured to impart a rotational force. For example, rotation mechanism 306 may comprise an electric motor, a spring, a threaded screw, and/or the like.

In an exemplary embodiment, rotation mechanism 306 comprises an electric motor 302 powered by a battery. Motor 302 may be coupled to control and guidance electronics, for example electronics configured to bring aerial delivery system 100 into a preset azimuth orientation, for example due west (270 degrees). Moreover, motor 302 and/or the associated control and guidance electronics may be configured for remote control, such that the azimuth orientation of aerial delivery system 100 may be repeatedly modified and/or updated, for example responsive to commands from a system operator. Motor 302 further comprises motor shaft 304, which is coupled to a suspension line of parachute 320. Upon activation of motor 302, motor shaft 304 is rotated, and aerial delivery system 100 thus rotates beneath parachute 320 responsive to the rotation of motor shaft 304. In this manner, aerial delivery system 100 may be oriented as desired.

Rotation mechanism 306 may also take advantage of the weight of aerial delivery system 100 to achieve a modified azimuth orientation. With reference now to FIG. 3B, in accordance with various exemplary embodiments, aerial delivery system 100 is suspended beneath parachute 320. Aerial delivery system 100 is coupled to rotation mechanism 306 via one or more slings 310. Rotation mechanism 306 comprises a lead screw 312, a nut 314, and a brake 316. Slings 310 may be fastened to rotation mechanism 306 as appropriate, for example at nut 314. Lead screw 312 and nut 314 are releasably engaged.

Lead screw 312 may comprise any suitable structure configured to translate a linear force (for example, a force exerted by aerial delivery system 100 due to gravity) at least partially into a rotational force. For example, lead screw 312 may comprise a threaded screw, a corkscrew, and/or the like. In an exemplary embodiment, lead screw 312 comprises a low-pitch threaded rod. Lead screw 312 is coupled to nut 314. Lead screw 312 is further configured with an arresting device (for example, a blocking pin) in order to prevent separation of lead screw 312 and nut 314 at the end of travel. Lead screw 312 is further coupled to brake 316 in order to allow aerial delivery system 100 to be controllably rotated beneath parachute 320 as nut 314 "unscrews" along lead screw 312 responsive to the weight of aerial delivery system 100. In an exemplary embodiment, lead screw 312 is an aluminum cylinder configured with a sling attachment fitting at a first end, and a stop pin at a second end. Lead screw 312 is further configured with a threaded outer groove configured to rotatably couple with nut 314. Moreover, lead screw 312 may comprise any suitable material and may be configured in any appropriate manner in order to cause and/or permit rotation of aerial delivery system 100.

Nut 314 may comprise any suitable structure configured to couple to lead screw 312. Further, nut 314 may comprise any suitable structure configured to receive at least a portion of rotational force generated by the interaction of lead screw 312 and nut 314, for example by nut 314 moving along rotating threads of lead screw 312. In an exemplary embodiment, nut 314 is an aluminum structure configured with multiple strap attachment points, and further configured with a threaded inner hole configured to rotatably couple with lead screw 312. However, nut 314 may comprise any suitable material and may be configured in any appropriate manner in order to rotate responsive to the weight of aerial delivery system 100.

Brake 316 may be any suitable device, mechanism, or system configured to retard the rotation of nut 314 along lead screw 312. In an exemplary embodiment, brake 316 comprises a mechanical clamp. In various other exemplary embodiments, brake 316 comprises a band brake controlled by an electromechanical solenoid. Brake 316 is configured to releasably engage with lead screw 312 to prevent and allow movement of nut 314. Moreover, brake 316 may be configured for remote control in order to allow a system operator to controllably modify the azimuth orientation of aerial delivery system 100.

The weight of aerial delivery system 100 beneath parachute 320 provides a downward force, which is at least partially translated into a rotational force by the interaction of lead screw 312 and nut 314. Initially, brake 316 is engaged, preventing nut 314 from "unscrewing" along lead screw 312. As brake 316 is loosened, nut 314 begins to rotate along lead screw 312, resulting in a modified azimuth orientation for aerial delivery system 100. Brake 316 may be re-engaged at any point, fixing nut 314 against lead screw 312 at a desired position. Brake 316 may also be repeatedly engaged and loosened in order to adjust the azimuth orientation of aerial delivery 100 as desired, for example responsive to wind gusts, inadvertent rotation of parachute 320, and/or the like. In this manner, aerial delivery system 100 may be "pointed" in a particular orientation. Moreover, aerial delivery system 100 may be "re-pointed" at a different orientation if desired, via further operation of brake 316. In various embodiments, aerial delivery system 100 may be "re-pointed" any desired number of times, provided further rotation of nut 314 with respect to lead screw 312 is still possible (i.e., provided that nut 314 has not traversed to the end of lead screw 312).

As will be appreciated, the above-illustrated principles regarding attitude and/or azimuth orientation, adjustment, and control for an aerial delivery system 100 may be applied in various settings, configurations, combinations, and/or the like, such that a particular aerial delivery system 100 and associated payload (e.g., one or more releasable items 199) may be rotated, translated, and/or otherwise moved and/or "pointed" in any desired direction relative to the associated stabilization system (e.g., a streamer, a ballute, a drogue parachute, a primary parachute, a recovery parachute, and/or the like). In this manner, an extended loiter time for rockets, cameras, and other useful items over a target area can be achieved.

As will be appreciated by one of ordinary skill in the art, principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

In the foregoing specification, the invention has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope of the present invention. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. An aerial delivery system, comprising;
a first linear guidance device; and
a first releasable securing mechanism configured to couple a first releasable item to the first linear guidance device, wherein the aerial delivery system is extractable from an aircraft via a parachute, and
wherein the first linear guidance device comprises a monorail configured to permit the release of the first releasable item having all control surfaces extended prior to extraction of the aerial delivery system from the aircraft.

2. The aerial delivery system of claim 1 wherein, responsive to operation of the first releasable securing mechanism, the first releasable item separates from the first linear guidance device during parachute-controlled descent of the aerial delivery system through the air.

3. The aerial delivery system of claim 1, wherein the aerial delivery system is tiltable with respect to a parachute to influence the separation trajectory of the first releasable item.

4. The aerial delivery system of claim 1, further comprising a rotation mechanism configured to allow the azimuth of the aerial delivery system with respect to a parachute to be varied.

5. The aerial delivery system of claim 4, wherein the rotation mechanism comprises a lead screw, a nut, and a brake.

6. The aerial delivery system of claim 5, wherein the azimuth of the aerial delivery system with respect to the parachute is varied responsive to the weight of the aerial delivery system exerted on the lead screw.

7. The aerial delivery system of claim 4, wherein the rotation mechanism is configured to vary the azimuth of the aerial delivery system prior to separation of the releasable item from the aerial delivery system.

8. The aerial delivery system of claim, wherein all control surfaces of the first releasable item are non-retractable.

9. The aerial delivery system of claim 1, wherein the first releasable item is at least one of a rocket, a missile, or a bomb.

10. The aerial delivery system of claim 1, wherein the first releasable item is piece of ordnance deployable only via the rear cargo door of the aircraft.

11. The aerial delivery system of claim 1, further comprising a second linear guidance device, wherein the second linear guidance device is configured to permit the release of a second releasable item having all control surfaces extended prior to extraction of the aerial delivery system from the aircraft.

12. The aerial delivery system of claim 11, wherein the second releasable item is released after release of the first releasable item to cause the second releasable item to impact the ground at a similar location to the first releasable item but at a later time.

13. The aerial delivery system of claim 1, further comprising:
a first strap having a first length;
a second strap having a second length; and
a parachute coupled to the first strap and the second strap, wherein, responsive to inflation of the parachute, the first strap and the second strap cause the aerial delivery system to achieve a predetermined orientation.

14. The aerial delivery system of claim 13, wherein the first length and the second length are different, and wherein the predetermined orientation of the aerial delivery system is an inclined attitude.

15. The aerial delivery system of claim 1, wherein the first releasable securing mechanism comprises a stored energy spring that imparts a force to the first releasable item to at least partially eject the first releasable item from the aerial delivery system under the guidance of the first linear guidance device.

16. An aerial delivery system extractable from an aircraft via a parachute, the aerial delivery system comprising:
a linear guidance device configured as a tongue and groove system;
a releasable securing mechanism for coupling a releasable item to the linear guidance device, wherein the releasable securing mechanism is configured to allow the releasable item to separate from the aerial delivery system during parachute-controlled descent of the aerial delivery system through the air; and
a rotation mechanism configured to allow the azimuth of the aerial delivery system with respect to a parachute to be varied during descent of the aerial delivery system through the air.

17. The aerial delivery system of claim 16, wherein the rotation mechanism comprises a lead screw, a nut, and a brake.

18. The aerial delivery system of claim 16, wherein the rotation mechanism is configured to vary the azimuth of the aerial delivery system with respect to the parachute prior to separation of the releasable item from the aerial delivery system.

19. The aerial delivery system of claim 16, wherein the linear guidance device is configured to permit the release of the first releasable item having all control surfaces extended prior to extraction of the aerial delivery system from the aircraft.

20. The aerial delivery system of claim 16, wherein the first releasable item is piece of ordnance deployable only via the rear cargo door of the aircraft.

* * * * *

UNITED STATES PATENT AND TRADEMARK OFFICE
CERTIFICATE OF CORRECTION

| | |
|---|---|
| PATENT NO. | : 8,186,624 B2 |
| APPLICATION NO. | : 13/301976 |
| DATED | : May 29, 2012 |
| INVENTOR(S) | : Roy L. Fox, Jr. |

It is certified that error appears in the above-identified patent and that said Letters Patent is hereby corrected as shown below:

In the Claims:

In Column 13, line 33, Claim 8, after "delivery system of claim" please insert --1--

Signed and Sealed this
Tenth Day of July, 2012

David J. Kappos
*Director of the United States Patent and Trademark Office*